(12) United States Patent
Shimizu et al.

(10) Patent No.: US 12,099,253 B2
(45) Date of Patent: Sep. 24, 2024

(54) LENS BARREL

(71) Applicants: NIKON CORPORATION, Tokyo (JP); TOCHIGI NIKON CORPORATION, Otawara (JP)

(72) Inventors: Kunihiko Shimizu, Tokyo (JP); Satoshi Waizumi, Otawara (JP); Takehiro Koizumi, Otawara (JP)

(73) Assignees: NIKON CORPORATION, Tokyo (JP); TOCHIGI NIKON CORPORATION, Otawara (JP)

( * ) Notice: Subject to any disclaimer, the term of this patent is extended or adjusted under 35 U.S.C. 154(b) by 923 days.

(21) Appl. No.: 17/256,471

(22) PCT Filed: Jun. 4, 2019

(86) PCT No.: PCT/JP2019/022173
§ 371 (c)(1),
(2) Date: Dec. 28, 2020

(87) PCT Pub. No.: WO2020/003921
PCT Pub. Date: Jan. 2, 2020

(65) Prior Publication Data
US 2021/0181458 A1 Jun. 17, 2021

(30) Foreign Application Priority Data
Jun. 28, 2018 (JP) ................ 2018-123657

(51) Int. Cl.
*G02B 7/10* (2021.01)
*G02B 7/02* (2021.01)
(Continued)

(52) U.S. Cl.
CPC ............... *G02B 7/10* (2013.01); *G02B 7/026* (2013.01); *G02B 15/14* (2013.01); *G03B 17/14* (2013.01)

(58) Field of Classification Search
CPC .......... G02B 7/10; G02B 7/026; G02B 15/14; G02B 7/102; G03B 17/14; G03B 2205/0046; G03B 2205/0053; G03B 3/10
See application file for complete search history.

(56) References Cited

U.S. PATENT DOCUMENTS

| | | |
|---|---|---|
| 2004/0114252 A1 | 6/2004 | Tanaka et al. |
| 2016/0065815 A1 | 3/2016 | Uemura |
| 2018/0113375 A1 | 4/2018 | Hasegawa et al. |

FOREIGN PATENT DOCUMENTS

| | | |
|---|---|---|
| JP | H07-63970 A | 3/1995 |
| JP | 2004-191668 A | 7/2004 |

(Continued)

OTHER PUBLICATIONS

Machine Translation of WO2015037283 (Year: 2015).*
(Continued)

*Primary Examiner* — Alicia M Harrington
(74) *Attorney, Agent, or Firm* — Oliff PLC

(57) ABSTRACT

A lens barrel capable of increasing the moving range of a lens includes: a lens retainer frame for holding a lens; a drive unit for driving the lens retainer frame along the optical axis direction; a first cylinder that holds the drive unit and has a cam follower; a second cylinder that has a cam groove for engaging the cam follower; and a bias part for biasing the first cylinder along the optical axis.

13 Claims, 4 Drawing Sheets

(51) Int. Cl.
G02B 15/14 (2006.01)
G03B 17/14 (2021.01)

(56) References Cited

FOREIGN PATENT DOCUMENTS

| | | |
|---|---|---|
| JP | 2011-033686 A | 2/2011 |
| JP | 2013-145272 A | 7/2013 |
| JP | 2016-048283 A | 4/2016 |
| JP | 2018-066916 A | 4/2018 |
| WO | WO-2015037283 A1 * | 3/2015 ............. G02B 7/102 |

OTHER PUBLICATIONS

Jan. 6, 2022 Office Action issued in Japanese Patent Application No. 2020-527328.
Feb. 24, 2022 Office Action issued in Chinese Patent Application No. 201980042859.X.
Sep. 10, 2019 International Search Report issued in International Patent Application No. PCT/JP2019/022173.

* cited by examiner

LENS BARREL

TECHNICAL FIELD

The present invention relates to a lens barrel.

BACKGROUND ART

A conventional lens barrel includes, for example, lens units that move synchronously in the optical axis direction; and other lens units between the lens units (see, for example, Patent Document 1).

In such a conventional lens barrel, the lens units between the synchronously moving lens units have a limited range of movement.

Patent Document 1: Japanese Unexamined Patent Application, Publication No. 2011-33686

DISCLOSURE OF THE INVENTION

The present invention is directed to a lens barrel including: a lens holding frame that holds a lens; a drive unit that drives the lens holding frame in an optical axis direction; a first tube that holds the drive unit and has a cam follower; a second tube having a cam groove that engages the cam follower; and an energizing part that energizes the first tube in the optical axis direction.

PREFERRED MODE FOR CARRYING OUT THE INVENTION

Description of Whole System

Figure 1:
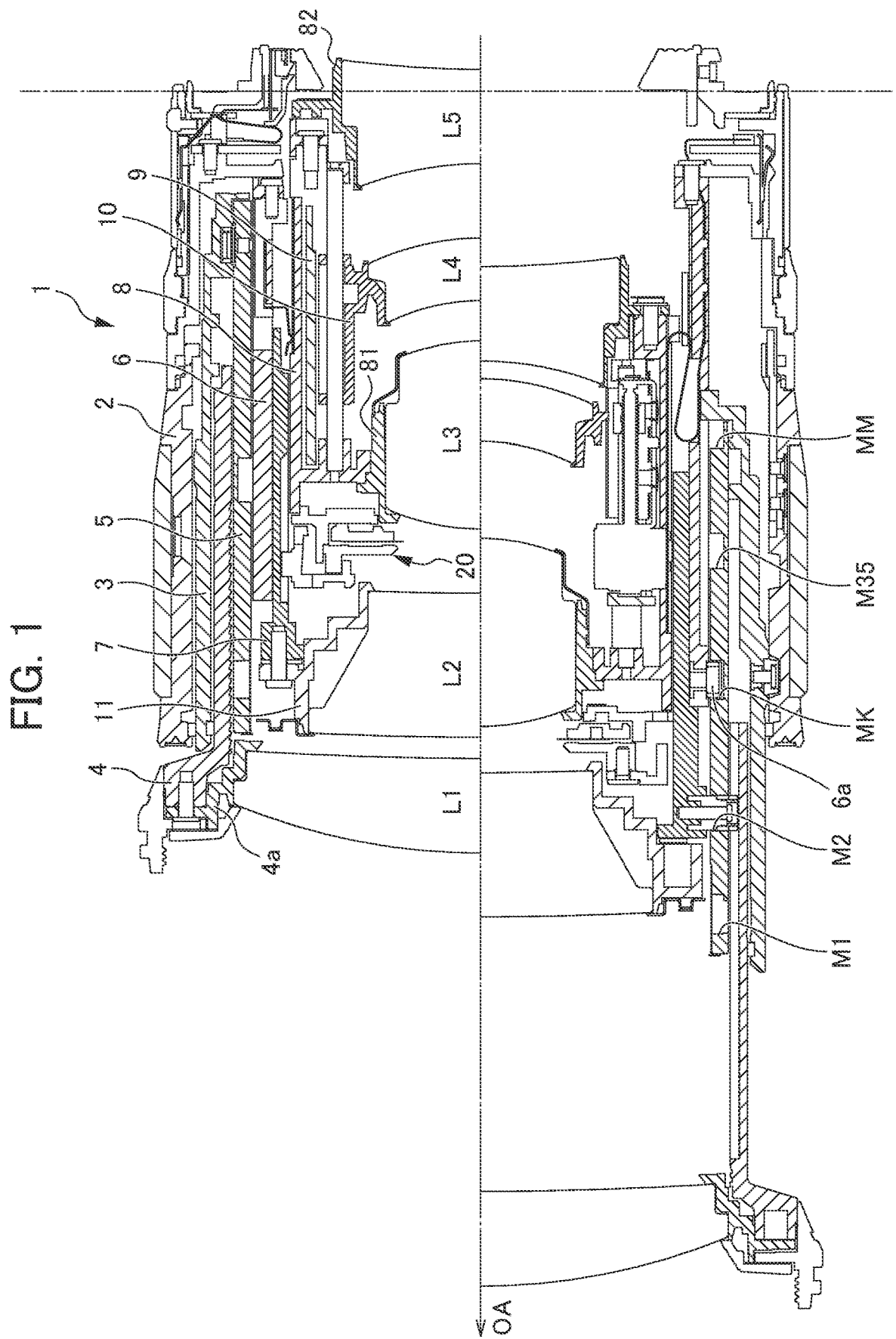
FIG. 1 is a cross-sectional view of a lens barrel according to an embodiment of the present invention.

FIG. 1 is a cross-sectional view of a lens barrel 1 according to an embodiment of the present invention. In the drawing, the left side in the optical axis OA direction is the object side (front side or plus side), and the right side in the optical axis OA direction is the body side (rear side or minus side). The lens barrel 1 has a range of imaging from telephoto to wide angle, and has a contracted state (also called a housed state or a collapsed state). The lens barrel 1 is an interchangeable lens system that is attachable to and detachable from a camera body (not shown). The upper part of FIG. 1 shows a state in which the lens barrel 1 is contracted to the minimum length, and the lower part shows a telephoto state in which the lens barrel 1 is extended to the maximum length.

The lens barrel 1 includes a first lens unit L1, a second lens unit L2, a third lens unit L3, a fourth lens unit L4, and a fifth lens unit L5. The fourth lens unit L4 is a focusing lens unit disposed between the third lens unit L3 and the fifth lens unit L5.

The lens barrel 1 includes, from the outer circumferential side (outer diameter side), a zoom ring 2, a rectilinear tube 3, a first lens unit tube 4, a cam tube 5, a fixed tube 6, a second lens unit tube 7, a third-fifth lens unit tube 8, a motor moving tube 9, and a fourth lens unit frame 10.

The zoom ring 2 rotates about the optical axis in accordance with the zooming operation by the user.

The fixed tube 6 is fixed with respect to the mount.

Figure 3:
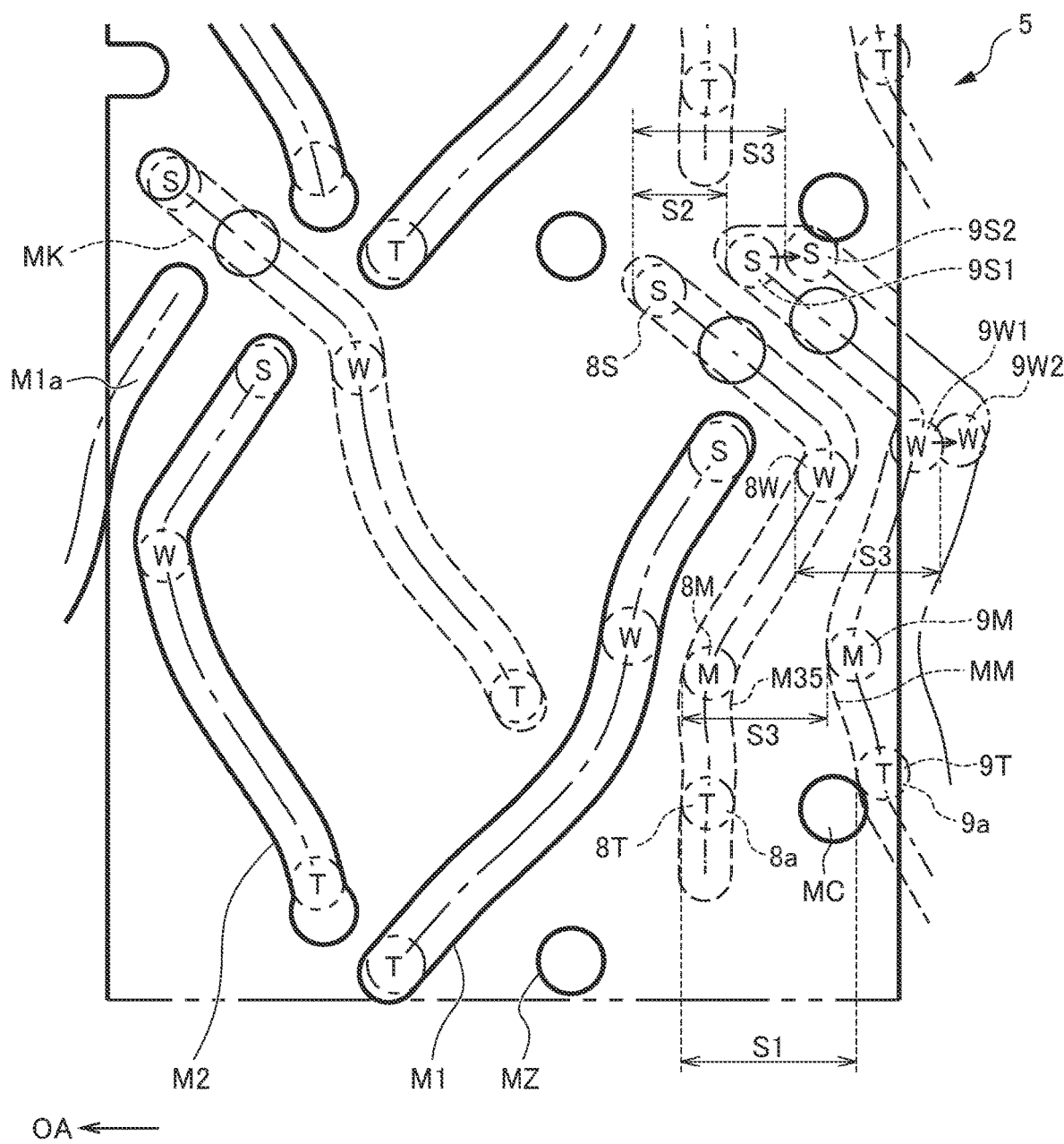
FIG. 3 is a developed view of the cam tube.

The cam tube 5 is provided with a zoom interlocking pin MZ and a rectilinear tube connecting pin MC (see FIG. 3). The zoom interlocking pin MZ engages a rectilinear groove provided at the inner circumference (inner diameter side) of the zoom ring 2. The rectilinear tube connecting pin MC engages a circumferential groove on the inner circumference of the rectilinear tube 3. The cam tube 5 has a cam groove MK that engages a cam follower 6a of the fixed tube 6. Thus, while being rotated together with the zoom ring 2, the cam tube 5 is fed out together with the rectilinear tube 3 with respect to the fixed tube 6.

The rectilinear tube 3 has a circumferential groove on the inner circumference as mentioned above, and is bayonet-coupled to the rectilinear tube connecting pin MC of the cam tube 5. The rectilinear tube 3 also has a rectilinear key (protrusion) on the inner circumference, which engages the rectilinear groove provided in the fixed tube 6. Thus, when the cam tube 5 is rotated and fed out due to the rotation of the zoom ring 2, the rectilinear tube 3 moves straight with respect to the fixed tube 6.

The first lens unit tube 4 holds a first lens unit frame 4a. The first lens unit frame 4a holds the first lens unit L1. The first lens unit tube 4 is provided with a cam follower which engages a first unit cam groove M1 of the cam tube 5. The outer circumference of the first lens unit tube 4 is also provided with a connecting pin, which engages a rectilinear groove on the inner circumference of the rectilinear tube 3 so that the first lens unit tube 4 moves straight without rotating. The second lens unit tube 7 holds a second lens unit frame 11. The second lens unit frame 11 holds the second lens unit L2.

The second lens unit tube 7 is provided with a cam follower which engages a second unit cam groove M2 of the cam tube 5. The outer circumference of the second lens unit tube 7 is further provided with a rectilinear key (protrusion), which engages a rectilinear groove of the fixed tube 6. Thus, the second lens unit tube 7 moves straight without rotating.

The third-fifth lens unit tube 8 is a moving tube that is disposed on the outer circumference of the motor moving tube 9 and is movable in the optical axis direction. The third-fifth lens unit tube 8 will be described in detail later. The motor moving tube 9 is disposed at the inner circumference of the third-fifth lens unit tube 8 and is movable in the optical axis direction. The motor moving tube 9 will be described in detail later.

The fourth lens unit frame 10 is a lens frame that holds the fourth lens unit L4.

An aperture mechanism 20 is attached to the front end of the third-fifth lens unit tube 8.

As the zoom ring 2 is rotated, the cam tube 5 is fed out while being rotated by the same angle as the angle of rotation of the zoom ring 2. As the cam tube 5 is rotated, the first lens unit L1, the second lens unit L2, the third lens unit L3, the fourth lens unit L4, and the fifth lens unit L5 each move straight along each cam groove in the optical axis direction. The fourth lens unit L4 is also movable in the optical axis direction by the driving force of a stepping motor 12, which will be described later.

Figure 2:
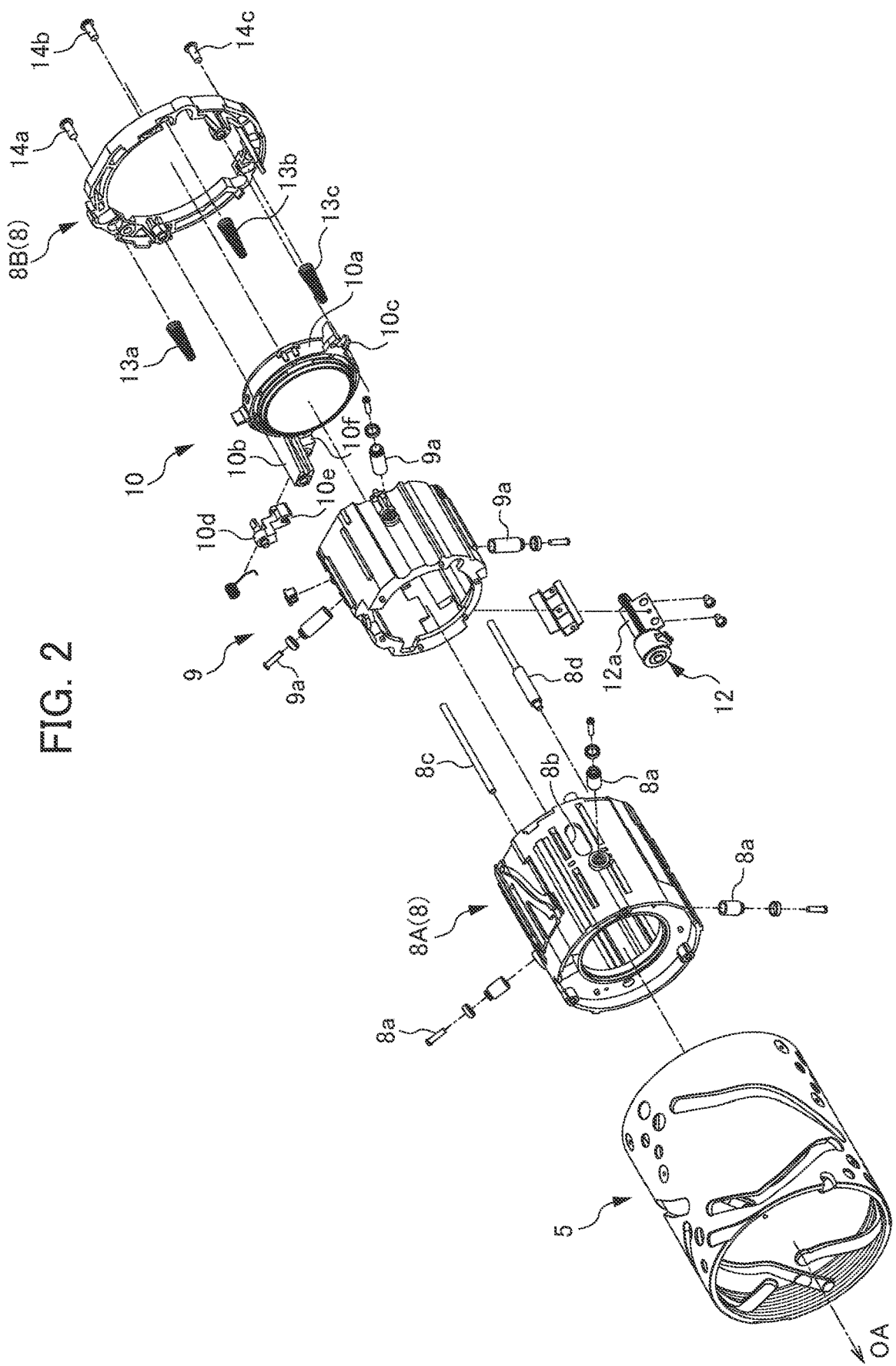
FIG. 2 is an exploded perspective view of a cam tube, a third-fifth lens unit tube, a motor moving tube, and a fourth lens unit frame.

Next, the cam tube 5, the third-fifth lens unit tube 8, the motor moving tube 9, the fourth lens unit frame 10 will be described in detail. FIG. 2 is an exploded perspective view of the cam tube 5, the third-fifth lens unit tube 8, the motor moving tube 9, and the fourth lens unit frame 10.

Cam Tube 5

FIG. 3 is a developed view of the cam tube 5. The cam tube 5 has a plurality of cam grooves. In FIG. 3, the solid lines indicate cam grooves provided on the outer surface or penetrating cam grooves, and the dotted lines indicate cam grooves provided on the inner surface.

Each cam groove engages the corresponding cam follower. In FIG. 3, the dotted circles drawn in each cam groove indicate the positions of the cam follower, in which the circled S indicates the position of the cam follower located when the barrel is in the contracted state, the circled W indicates the position of the cam follower located when the barrel is in the wide angle state, the circled T indicates the position of the cam follower located when the barrel is in the telephoto state, and the circled M indicates the position of the cam follower located when the barrel is in the middle state between the wide angle state and the telephoto state.

The first unit cam groove M1 is for the drive of the first lens unit tube 4 which holds the first lens unit L1.

An impact cam groove M1a is provided to address impact. The impact cam groove M1a engages an impact countermeasure pin (not shown) provided in the first lens unit tube 4 when the lens barrel is in a state ranging from the contracted state to the wide angle state.

The second unit cam groove M2 is a through groove for the drive of the second lens unit tube 7 which holds the second lens unit frame 11. The cam groove MK engages the cam follower 6a extending from the fixed tube 6.

The cam groove MK is for rotating the cam tube 5 with respect to the fixed tube 6 and for feeding the cam tube 5.

A third-fifth unit groove M35 and a motor cam groove MM will be described later.

The cam tube 5 is also provided with a zoom interlocking pin MZ, which engages the rectilinear groove provided on the inner surface of the zoom ring 2, and provided with a rectilinear tube connecting pin MC, which engages the circle groove provided on the inner surface of the rectilinear tube 3.

Third-Fifth Unit Cam Groove M35

The third-fifth unit cam groove M35 is for the drive of the third-fifth lens unit tube 8. The third-fifth lens unit tube 8 holds the third lens unit L3 at the front end and holds the fifth lens unit L5 at the rear end. The third-fifth unit cam groove M35 has a width substantially equal to the width (diameter) of the cam follower 8a (described later) which moves in the third-fifth unit cam groove M35. In other words, when a certain focal length is reached and the cam follower 8a is at a predetermined position in the third-fifth unit cam groove M35, the cam follower 8a can move within the tolerance range in the optical axis direction, but cannot move beyond the tolerance range in the optical axis direction.

Motor Cam Groove MM

The motor cam groove MM is for the drive of the motor moving tube 9.

The motor cam groove MM engages the cam follower 9a, which is described later. The cam follower 9a moves in the motor cam groove MM when the state of the lens barrel 1 is changed to the telephoto, wide angle, or contracted state. The motor cam groove MM is opened at one side in the optical axis direction. In other words, the motor cam groove MM has no wall at one side in the optical axis direction. The motor cam groove MM has a wall at the other side in the optical axis direction. In the example shown in FIG. 3, the rear side of the motor cam groove MM is opened. Alternatively, the front side of the motor cam groove MM may be opened when the motor cam groove MM is provided on a front portion of the cam tube 5.

One side of the motor cam groove MM may be opened over the whole area or opened in a partial area. In the example shown in FIG. 3, the motor cam groove MM has walls at both sides when the barrel is in the contracted state, whereas one side (rear side) of the motor cam groove MM is opened when the barrel is in other states.

In the area where walls are provided at both sides, the motor cam groove MM has a width that is wider than the width (diameter) of the cam follower 9a and about 2 times or more the width of the cam follower 9a in the optical axis OA direction. Thus, the cam follower 9a can move in the optical axis OA direction. In other words, when a certain focal length is reached and the cam follower 9a is at a predetermined position in the motor cam groove MM, the cam follower 9a can move within the tolerance range in the optical axis direction. This will be described in detail later.

In FIG. 3, 8S (circled S) represents the position of the cam follower 8a in the third-fifth unit cam groove M35 of the lens barrel in the contracted state, 8W (circled W) represents the position of the cam follower 8a in the cam groove M35 of the lens barrel in the wide angle state, 8T (circled T) represents the position of the cam follower 8a in the third-fifth unit cam groove M35 of the lens barrel in the telephoto state, and 8M (circled M) represents the position of the cam follower 8a in the third-fifth unit cam groove M35 of the lens barrel in the middle state between the wide angle state and the telephoto state.

In FIG. 3, 9S1 and 9S2 (circled S) respectively represent the front and rear side positions of the cam follower 9a in the motor cam groove MM of the lens barrel in the contracted state, and 9W1 and 9W2 (circled W) respectively represent the front and rear side positions of the cam follower 9a in the motor cam groove MM of the lens barrel in the wide angle state.

In FIG. 3, 9T (circled T) represents the position of the cam follower 9a of the lens barrel in the telephoto state. In FIG. 3, 9M (circled M) represents the position of the cam follower 9a of the lens barrel in the middle state between the wide angle state and the telephoto state.

Third-Fifth Lens Unit Tube 8

Referring back to FIG. 2, the third-fifth lens unit tube 8 includes a third-fifth lens unit tube body 8A and a third-fifth lens unit tube rear end part 8B attached to the rear end of the third-fifth lens unit tube body 8A.

A third lens unit holding frame 81 shown in FIG. 1 (not shown in FIG. 2) is held at a front portion of the lens third-fifth lens unit tube body 8A. A fifth lens unit holding frame 82 shown in FIG. 1 (not shown in FIG. 2) is held at a rear portion of the third-fifth lens unit tube rear end part 8B. Three cam followers 8a are provided at positions spaced about 120 degrees apart from each other along the same circumference.

The three cam followers 8a are provided from the outer surface of the third-fifth lens unit tube 8 toward the outer circumferential side. The cam followers 8a each penetrate a rectilinear groove (not shown) of the fixed tube 6 and engage the third-fifth unit cam groove M35. The outer circumferential surface of the third-fifth lens unit tube 8 is provided with three rectilinear keys (protrusions), which are located at positions spaced about 120 degrees apart from each other along the same circumference. The rectilinear keys each engage a rectilinear groove 7c provided on the inner surface of the second lens unit tube 7. Thus, the third-fifth lens unit tube 8 moves straight without rotating.

Inside the inner circumference of the third-fifth lens unit tube 8, a main guide bar 8c and a sub guide bar 8d extend along the optical axis OA to guide the fourth lens unit frame 10. The main guide bar 8c and the sub guide bar 8d are supported at the front and rear ends of the third-fifth lens unit tube 8.

Penetrating elongated holes 8b are provided at positions spaced about 120 degrees apart from each other along the same circumference of the third-fifth lens unit tube 8. Cam followers 9a (described later) are provided in the elongated holes 8b.

Motor Moving Tube 9

The outer surface of the motor moving tube 9 is provided with three cam followers 9a at positions spaced about 120 degrees apart from each other along the same circumference.

The three cam followers 9a are provided toward the outer circumferential side. The cam followers 9a each engage the motor cam groove MM through the elongated hole 8b of the third-fifth lens unit tube 8 and through a rectilinear groove (not shown) of the fixed tube 6. The motor moving tube 9 is also provided with a rectilinear key (protrusion) which engages a rectilinear groove provided in the third-fifth lens unit tube 8. Thus, the motor moving tube 9 moves straight without rotating.

A stepping motor 12 is attached to the motor moving tube 9.

A rotary shaft 12a with a thread groove on its outer circumference extends from the stepping motor 12 in the optical axis OA direction.

Fourth Lens Unit Frame 10

As shown in FIG. 2, the fourth lens unit frame 10 includes a frame portion 10a for covering the outer circumference of the fourth lens unit L4; a main guide bar holding portion 10b extending from the frame portion 10a toward the front side; and a sub guide holding portion 10c provided opposite to the main guide bar holding portion 10b on the frame portion 10a about the optical axis OA (or provided at a position spaced about 180 degrees apart from the portion 10b about the optical axis OA). In this regard, the sub guide bar holding portion 10c does not always have to be provided at a position spaced about 180 degrees apart from the main guide bar holding portion 10b about the optical axis OA.

The main guide bar holding portion 10b holds the main guide bar 8c. The fourth lens unit L4 (fourth lens unit frame 10) is movable in the optical axis OA direction, being guided by the main guide bar. The sub guide bar holding portion 10c is U-shaped, through which the sub guide bar 8d passes. The main guide bar holding portion 10b prevents the rotation of the fourth lens unit L4 (fourth lens unit frame 10). In this regard, the sub guide bar holding portion 10c may not be U-shaped as long as it can prevent the rotation of the fourth lens unit L4.

The main guide bar holding portion 10b has a predetermined length in the optical axis OA direction to prevent the falling (tilting) of the fourth lens unit L4. For example, the main guide bar holding portion 10b is longer than the rotary shaft 12a of the stepping motor 12. The main guide bar holding portion 10b may be longer than the moving distance from the collapsed state (or wide angle state) of the fourth lens unit L4 to the telephoto state. This increases the length over which the main guide bar holding portion 10b engages the main guide bar and can prevent the falling (tilting) of the fourth lens unit L4. In FIGS. 1 and 2, the main guide bar holding portion 10b extends forward beyond the frame portion 10a.

A rack mount 10f is provided in the vicinity of the main guide bar holding portion 10b on the frame portion 10a. A rack 10d is attached to the rack mount 10f. The rack 10d includes a motor engagement portion 10e that is U-shaped in cross-section and has a thread groove on its inner surface. The thread groove on the inner surface of the motor engagement portion 10e engages the thread groove on the outer surface of the rotary shaft 12a of the stepping motor 12. This allows the fourth lens unit L4 to move in the optical axis direction as the stepping motor 12 is driven to rotate the rotary shaft 12a.

Spring Members 13

Spring members 13a, 13b, and 13c are disposed at three positions spaced about 120 degrees apart from each other between the front side of the third-fifth lens unit tube rear end part 8B and the rear side of the motor moving tube 9. Hereinafter, the spring members 13a, 13b, and 13c are collectively called the spring member or members 13 when they are not distinguished from each other in the description. The spring members 13 energize the motor moving tube 9 toward the front side with respect to the third-fifth lens unit tube rear end part 8B. In other words, the spring members 13 energize the motor moving tube 9 in a direction away from the third-fifth lens unit tube rear end part 8B. Thus, the spring member 13 energizes the cam follower 9a forward so that the cam follower 9a comes into contact with the front side wall of the motor cam groove MM. In other words, the spring member 13 energizes the motor moving tube 9 toward the front side wall of the motor cam groove MM. Therefore, when the focal length of the lens barrel 1 is changed, the cam follower 9a can move along the front side wall of the motor cam groove MM. In this regard, the direction of the energizing by the spring member 13 is not limited to the direction mentioned above as long as the energizing can be toward the wall of the motor cam groove MM.

In this case, the motor cam groove MM of the cam tube 5 is opened at the rear side as mentioned above. Otherwise, the width of the motor cam groove MM is wider than the width (diameter) of the cam follower 9a. Therefore, when a force toward the minus side (body side) in the optical axis OA direction is applied to the motor moving tube 9, the cam follower 9a can move in the optical axis OA direction within the motor cam groove MM.

The third-fifth lens unit tube 8 is provided with the main guide bar 8c and the sub guide bar 8d. Thus, the main guide bar 8c for guiding the fourth lens unit L4 and the spring member 13 for energizing the motor moving tube 9 equipped with the stepping motor 12 for driving the fourth lens unit L4 are disposed in the same part (the third-fifth lens unit tube rear end part 8B). This allows the fourth lens unit L4 to move in a high performance manner.

The spring members 13 are conical springs (conical coil springs). When conical coil springs are used, the springs will not be out of position even in the compressed state, so that they can energize the motor moving tube 9 and the third-fifth lens unit tube 8 in a high performance manner. Therefore, the springs can be prevented from buckling when compressed and can maintain stable position.

Moreover, screws 14a, 14b, and 14c for fixing the third-fifth lens unit tube body 8A to the third-fifth lens unit tube rear end part 8B are each aligned on substantially the same linear line with each of the spring members 13a, 13b, and 13c (see FIG. 2). Thus, the spring member 13a is disposed closer to the screw 14a than to the screws 14b and 14c. This allows accurate energizing of the third-fifth lens unit tube 8 and the motor moving tube 9.

Furthermore, when the spring members 13 are disposed at the same rotation angle positions as the cam followers 9a, the motor moving tube 9 can move stably with respect to the third-fifth lens unit tube 8 even though a force is applied in the OA direction.

In the lens barrel 1, when the zoom ring 2 is rotated, the cam tube 5 also rotates. During this time, the third-fifth unit cam groove M35 and the motor cam MM respectively allow the third-fifth lens unit tube 8 and the motor moving tube 9 to move in the optical axis OA direction.

As the stepping motor 12 is driven, the rotary shaft 12a is rotated to allow the rack 10d, the fourth lens unit frame 10, and the fourth lens unit L4 to move in the optical axis OA direction with respect to the motor moving tube 9. During this time, the main guide bar holding portion 10b of the fourth lens unit frame 10 and the sub guide bar holding portion 10c are respectively guided to move straight by the main guide bar 8c and the sub guide bar 8d.

Thus, the fourth lens unit L4 is movable in the optical axis direction along the motor cam groove MM, and is also movable in the optical axis direction by the stepping motor 12.

FIGS. 4A to 4E are diagrams illustrating how the cam tube 5, the third-fifth lens unit tube 8, the motor moving tube 9, the fourth lens unit frame 10, and the stepping motor 12 are driven. That is described with reference to FIGS. 3 and 4A to 4E.

Figure 4D:
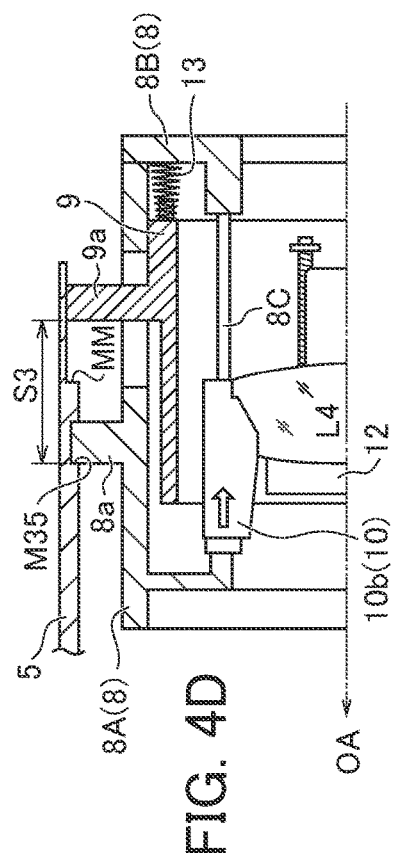
FIGS. 4A to 4E are diagrams illustrating the movement of the cam tube, the third-fifth lens unit tube, the motor moving tube, and the fourth lens unit frame.
Figure 4E:
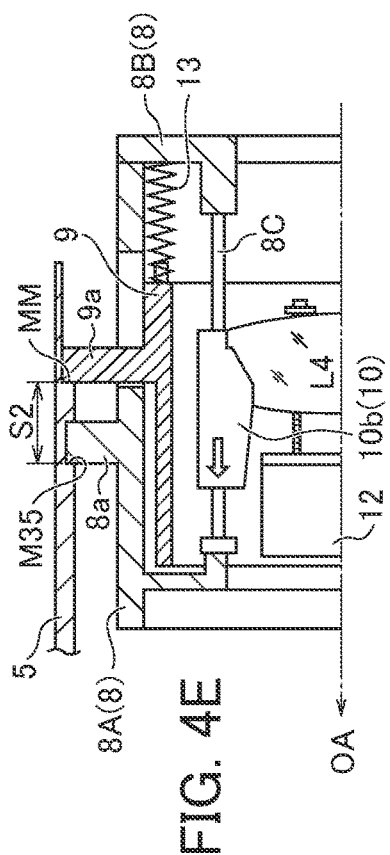
Figure 4A:
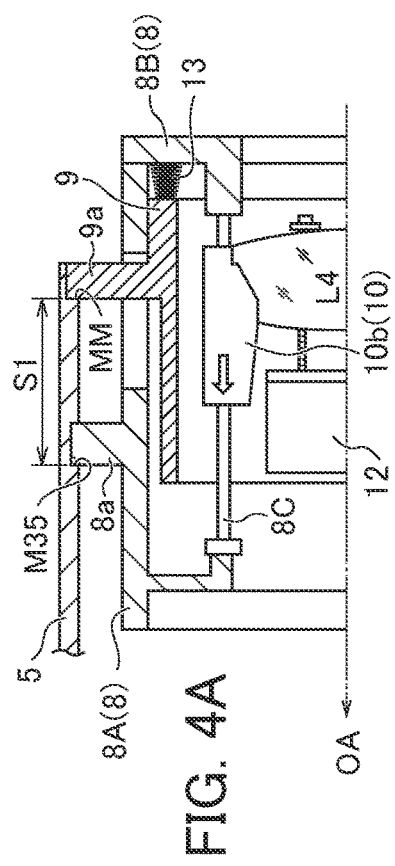

FIG. 4A shows a telephoto state with infinity focus.

The relative positional relationship between the third-fifth lens unit tube 8 and the motor moving tube 9 in the optical axis OA direction is determined by the distance S1 between the cam follower 8a in the third-fifth unit cam groove M35 and the cam follower 9a in the motor cam groove MM.

In this case, the spring member 13 energizes the cam follower 9a forward so that the can follower 9a comes into contact with the front side wall of the motor cam groove MM.

Therefore, the distance between the front end of the cam follower 8a and the front end of the cam follower 9a is S1 shown in FIGS. 3 and 4A.

Figure 4B:
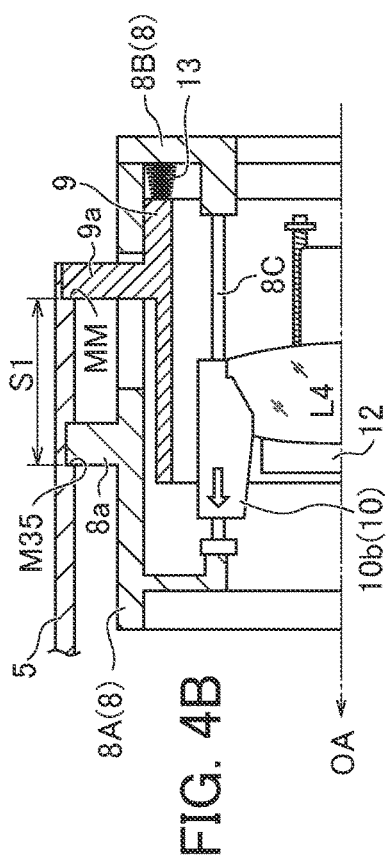

FIG. 4B shows a telephoto state with close range focus. Regarding the shooting distance (object distance, focus position), to change, in the telephoto state, from the infinity focus of FIG. 4A to the close range focus, the stepping motor 12 is driven to move the fourth lens unit L4 and the fourth lens unit frame 10 forward along the arrow shown in FIG. 4A, so that the state of FIG. 4B is reached.

As mentioned above, the main guide bar holding portion 10b engages the main guide bar 8c over a long distance and extends forward beyond the frame portion 10a in order to prevent the tilting of the fourth lens unit L4.

Therefore, when the fourth lens unit L4 and the fourth lens unit frame 10 are moved forward, the front end of the main guide bar holding portion 10b projects forward beyond the front end of the motor moving tube 9 as shown in FIG. 4B. This means that the stepping motor 12 allows the main guide bar holding portion 10b (fourth lens unit frame 10) to move out of the motor moving tube 9 in the optical axis direction.

As shown in FIG. 4B, when the stepping motor 12 is powered off with the front end of the main guide bar holding portion 10b projecting forward beyond the front end of the motor moving tube 9, the fourth lens unit L4 (fourth lens unit frame 10) is not allowed to move in the optical axis OA direction with respect to the motor moving tube 9. In other words, the relative positional relationship between the fourth lens unit L4 and the motor moving tube 9 is fixed.

The lens barrel 1 according to an embodiment of the present invention can be changed to the contracted state (housed state) or changed in focal length by the rotation of the zoom ring 2. Therefore, it is conceivable that the photographer will rotate the zoom ring 2 while the front end of the main guide bar holding portion 10b projects forward beyond the front end of the motor moving tube 9 (in the state of FIG. 4B). When the photographer rotates the zoom ring 2, the relative positional relationship between the third-fifth lens unit tube 8 and the motor moving tube 9 changes in accordance with the shapes of the third-fifth unit cam groove M35 and the motor cam groove MM.

In the telephoto state, the distance S1 shown in FIG. 3 is the distance in the optical axis OA direction between the front end of the cam follower 8a in the third-fifth unit cam groove M35 and the front end of the cam follower 9a in the motor cam groove MM. In the contracted state, the distance S2 shown in FIG. 3 is the distance in the optical axis OA direction between the front end of the cam follower 8a in the third-fifth unit cam groove M35 and the front end of the cam follower 9a in the motor cam groove MM. The distance S2 is smaller than the distance S1 (S1>S2). That is, when the telephoto state is changed to the wide angle or contracted state, the distance between the third-fifth lens unit tube 8 and the motor moving tube 9 is reduced.

When the zoom ring 2 is rotated with the main guide bar holding portion 10b not projecting beyond the motor moving tube 9 (e.g., in the telephoto state with infinity focus), the wide angle or contracted state is reached so that the third-fifth lens unit tube 8 and the motor moving tube 9 come closer to each other. In this case, the main guide bar holding portion 10b does not project beyond the motor moving tube 9, and therefore the third-fifth lens unit tube 8 and the main guide bar holding portion 10b (fourth lens unit frame 10) do not come into contact with each other. Therefore, even when the stepping motor 12 is powered off in the state of FIG. 4A and the relative positional relationship between the motor moving tube 9 and the fourth lens unit frame 10 is fixed, the zoom ring 2 can be rotated from the telephoto state to the contracted state. For example, FIG. 4E shows the contracted state reached after the power is turned off in the telephoto state with infinity focus.

When the power is turned off with the main guide bar holding portion 10b projecting beyond the motor moving tube 9 as shown in FIG. 4B (e.g., in the telephoto state with close range focus), the relative positional relationship between the motor moving tube 9 and the fourth lens unit frame 10 is fixed.

When the zoom ring 2 is rotated in this state, the third-fifth lens unit tube 8 and the motor moving tube 9 (the fourth lens unit frame 10 and the main guide bar holding portion 10b) come closer to each other according to the shapes of the third-fifth group cam groove M35 and the motor cam groove MM.

Figure 4C:
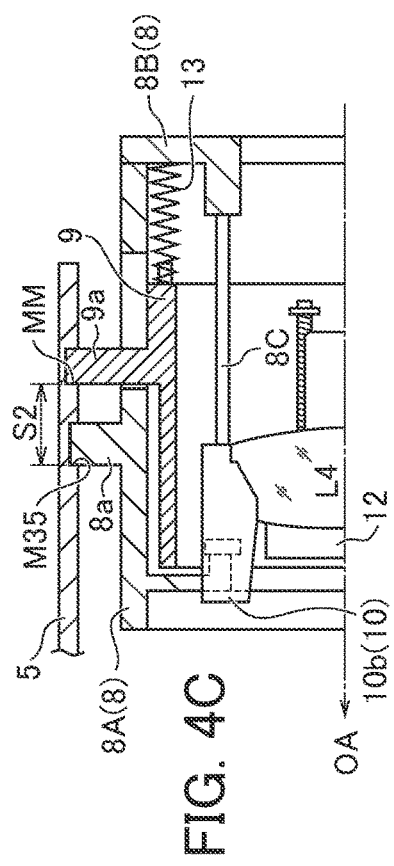

In this case, the main guide bar holding portion 10b projects beyond the motor moving tube 9, and thus the third-fifth lens unit tube 8 and the main guide bar holding portion 10b (fourth lens unit frame 10) come into contact with each other. Therefore, the third-fifth lens unit tube 8 and the motor moving tube 9 cannot approach S2 even when the power is turned off in the telephoto state with close range focus (FIG. 4B) and followed by attempts to contract the barrel into a contracted state. This means that the state as shown in FIG. 4C cannot be reached.

If the motor cam groove MM is not opened at the rear side, the cam follower 8a and the cam follower 9a can only approach up to S3 since the rear side wall of the motor cam groove MM obstructs the cam follower 9a. For example, the cam follower 8a and the cam follower 9a cannot move to the wide-angle side (contracted side) beyond the positions 8M and 9M shown in FIG. 3.

Therefore, the user feels a sense of wrongness since the user cannot rotate the zoom ring 2 halfway through when trying to contract the barrel by turning off the power in the telephoto state with close range focus.

In the embodiment of the present invention, however, the motor cam groove MM is opened at the rear side. Therefore, the motor moving tube 9 and the fourth lens unit frame 10 can move toward the rear side since they are pushed by the third-fifth lens unit tube 8.

As a result, the cam follower 8a and the cam follower 9a can move to the wide angle side (contracted side) from the positions 8M and 9M shown in FIG. 3 with the distance S3 maintained between the third-fifth lens unit tube 8 and the motor moving tube 9 (between the front end of the cam follower 8a and the front end of the cam follower 9a). FIG. 4D shows the contracted state reached after the power is turned off in the telephoto state with close range focus (FIG. 4B).

When the user turns the power off in the telephoto state with close range focus (FIG. 4B) and turns the zoom ring 2, the cam follower 9a of the motor moving tube 9 can move from the position 9T shown in FIG. 3 to the position 9S2 through the position 9W2 so that the collapsed state can be reached.

Thereafter, when the power is turned on, the stepping motor 12 first moves the fourth lens unit frame 10 to the infinity focus position.

For example, suppose that the user turns the zoom ring 2 to the wide angle position after turning the power off in the telephoto state with close range focus. As a result, the cam follower 8a and the cam follower 9a reach the positions 8W and 9W2.

If the user turns on the power in this state, a through image with aberration or blurring will be displayed on the display unit. This is because, in the wide angle state, the cam follower 8a and the cam follower 9a are in the positions 8W and 9W2 despite the positions 8W and 9W1 being the best.

Upon this, the stepping motor 12 moves the fourth lens unit frame 10 to the infinity focus position when the power is turned on, so that the fourth lens unit frame 10 will not project beyond the motor moving tube 9.

As a result, the cam follower 8a and the cam follower 9a can be in the positions 8W and 9W1 appropriate for the wide angle state, so that a through image can be displayed without aberration or blurring. This allows the cam follower 9a to come into contact with the front side face of the motor cam grove MM by means of the spring member 13 so that the infinity focus state, which is the initial state, can be recovered.

In the embodiment, the stepping motor 12 is fixed on the motor moving tube 9, which is disposed inside the third-fifth lens unit tube 8 and is allowed to move forward and rearward in the optical axis direction by the cam tube 5. The third-fifth lens unit tube 8 and the motor moving tube 9 are configured to be driven by means of different third-fifth unit cam grooves M35 and motor cam grooves MM during zooming. This makes it possible to drive the fourth lens unit L4 (focusing lens) such that a constant shooting distance can always be maintained in coordination with zooming.

The motor cam groove MM of the cam tube 5 is opened at the rear side or the motor cam groove MM has a wider width, and the cam follower 9a is allowed to come into contact with the front side face of the motor cam grove MM and used during zooming. This means that there is no need to make the rear side portion with high precision, which makes it easy to manufacture the mold. Since one wall is not necessary, molded components, if used, can be easily manufactured. Moreover, there is no need to form the rear side wall of the motor cam groove MM, which makes it possible to increase the space efficiency in the optical axis OA direction and to downsize the lens barrel 1.

The motor moving tube 9 does not directly hold (fix) the lens. Therefore, the optical performance is less affected even when the motor cam groove MM is opened at one side or the motor cam groove MM has a wider width. Furthermore, energizing by springs affects the optical performance less since the motor moving tube 9 does not directly hold (fix) the lens.

The main guide bar 8c and the sub guide bar 8d are held by the third-fifth lens unit tube 8. That is, the motor moving tube 9 does not hold any guide bar, so that the optical performance is less affected even when the motor cam groove MM for the motor moving tube 9 is opened at one side or the motor cam groove MM has a wider width. Furthermore, energizing by springs affects the optical performance less since the motor moving tube 9 does not directly hold (fix) the lens.

The motor cam groove MM is opened at one side or the motor cam groove MM has a wider width. In addition, the motor moving tube 9 and the third-fifth lens unit tube 8 are energized by springs. Therefore, the fourth lens unit frame 10 can move forward until it goes beyond the motor moving tube 9. This makes it possible to increase the range of movement of the fourth lens unit L4 (focusing lens) and to reduce the minimum shooting distance. Furthermore, not needing to reduce the length of engagement of the main guide bar holding portion 10b makes it possible to reduce the minimum shooting distance while the tilting of the fourth lens unit L4 is suppressed.

The third-fifth lens unit tube 8 is made with higher precision than the motor moving tube 9 so as to hold the third lens unit L3 and the fifth lens unit L5. Therefore, the fourth lens unit frame 10 can be driven at higher accuracy by using the main and sub guide bars 8c and 8d on the third-fifth lens unit tube 8 to guide the fourth lens frame 10 than by, for example, providing a guide bar on the motor moving tube 9 and using it to guide the fourth lens unit frame 10.

It should be noted that the main guide bar holding portion 10b extending forward beyond the frame portion 10a is descried as a non-limiting example. The main guide bar holding portion 10b may extend rearward beyond the frame portion 10a. In that case, the front side wall of the motor cam groove MM may be eliminated and the spring members may be provided to do energizing such that the cam follower 9a comes into contact with the rear side wall of the motor cam groove MM. Alternatively, the width of the motor cam groove MM may be made wider than the width of the cam follower 9a, and the spring members may be provided to do energizing such that the cam follower 9a comes into contact with the rear side wall of the motor cam groove MM.

It should be noted that the fourth lens unit frame 10 (main guide bar holding portion 10b) projecting beyond the motor moving tube 9 in the telephoto state with close range focus is described as a non-limiting example. Depending on the lens configuration, the fourth lens unit frame 10 (main guide bar holding portion 10b) may be allowed to project beyond the motor moving tube 9 in one of the telephoto-infinity focus state, the wide angle-close range focus state, or other states.

It should be noted that the third-fifth lens unit tube 8 movable in the optical axis direction is described as a non-limiting example. The third-fifth lens unit tube 8 may be configured not to move in the optical axis direction. It should also be noted that the stepping motor is described as a non-limiting example of the motor for driving the fourth lens unit L4. Any other motor may be used, such as a voice coil motor or an ultrasonic motor.

It should be noted that the fourth lens unit L4 is described as a non-limiting example of the focusing lens system. Alternatively, a zoom lens driven by a stepping motor (STM) during zooming may be used. It should be also be noted that the fourth lens unit L4 provided between the third and fifth lens units L3 and L5 movable together is described as a non-limiting example. For example, the second lens unit L2 may be provided between the first and third lens units L1 and L3 movable together, or any other configuration may be used. It will be understood that all the components described above are not always necessary and any combination of the components may be used.

EXPLANATION OF REFERENCE NUMERALS

L1: first lens unit, L2: second lens unit, L3: third lens unit, L4: fourth lens unit, L5: fifth lens unit, M1a: impact cam groove, M1: first unit cam groove, M2: second unit cam groove, M35: third-fifth unit cam groove, MC: rectilinear tube connecting pin, MK: cam groove, MM: motor cam groove, MZ: zoom interlocking pin, OA: optical axis, 1: lens barrel, 2: zoom ring, 3: rectilinear tube, 4: first lens unit tube, 5: cam tube, 6: fixed tube, 6a: cam follower, 7 second lens third-fifth lens unit tube 8: third-fifth lens unit tube, 8A: third-fifth lens unit tube body, 8B: third-fifth lens unit tube rear end part, 8a: cam follower, 8b: elongated hole, 8c: main guide bar, 8d: sub guide bar, 9: motor moving tube, 9a: cam follower, 10: fourth lens unit frame, 10a: frame portion, 10b: main guide bar holding portion; 10c: sub guide bar holding portion, 10d: motor mount rack, 10e: motor engagement portion, 10f: rack mount, 11: second lens unit frame, 12: stepping motor, 12a: rotary shaft, 13: spring member, 20: aperture mechanism, 81: third lens unit holding frame, 82: fifth lens unit holding frame

The invention claimed is:

1. A lens barrel comprising:
a lens holding frame that holds a lens;
a drive unit that drives the lens holding frame in an optical axis direction;
a first tube that holds the drive unit and has a cam follower;
a second tube having a cam groove that engages the cam follower;
a third tube between the first tube and the second tube; and
an energization member that energizes the first tube in the optical axis direction,
wherein a positional relationship in the optical axis direction between the first tube and the third tube varies with focal length.

2. The lens barrel according to claim 1, wherein the cam groove has a width wider than that of the cam follower.

3. The lens barrel according to claim 1, wherein the cam groove has a wall at one side in the optical axis direction and has an area with no wall at another side.

4. The lens barrel according to claim 3, wherein the energization member energizes the first tube toward the one side of the cam groove.

5. The lens barrel according to claim 1, wherein the lens holding frame is movable to outside of the first tube in the optical axis direction by means of the drive unit.

6. The lens barrel according to claim 1, wherein the lens holding frame is movable, by means of the drive unit, to a position in which the lens holding frame does not overlap with the first tube in a diameter direction about the optical axis.

7. The lens barrel according to claim 1, wherein the lens holding frame has a state in which the lens holding frame is in contact with the third tube.

8. The lens barrel according to claim 1, wherein the energization member energizes the first tube and the third tube.

9. The lens barrel according to claim 1, wherein the third tube holds a guide bar that guides the lens holding frame in the optical axis direction.

10. The lens barrel according to claim 1, wherein the first tube does not fix the lens and any other lens.

11. The lens barrel according to claim 1, wherein the lens is a focusing lens.

12. The lens barrel according to claim 1, further comprising
a power unit that supplies power to the drive unit, wherein the drive unit moves the lens in the optical axis direction when the power is supplied from the power unit after power supply from the power unit is stopped.

13. The lens barrel according to claim 1, wherein the cam groove is provided in an end portion of the second tube.

* * * * *